US006490153B1

(12) United States Patent
Casebolt et al.

(10) Patent No.: US 6,490,153 B1
(45) Date of Patent: Dec. 3, 2002

(54) COMPUTER SYSTEM FOR HIGHLY-DENSE MOUNTING OF SYSTEM COMPONENTS

(75) Inventors: Matthew P. Casebolt, Fremont, CA (US); Robert E. Ogrey, San Jose, CA (US)

(73) Assignee: California Digital Corporation, Fremont, CA (US)

( * ) Notice: Subject to any disclaimer, the term of this patent is extended or adjusted under 35 U.S.C. 154(b) by 0 days.

(21) Appl. No.: 09/370,121

(22) Filed: Aug. 6, 1999

(51) Int. Cl.[7] .................................................. G06F 1/16
(52) U.S. Cl. ........................ 361/685; 361/683; 361/684; 361/686; 361/687; 361/724
(58) Field of Search ................................ 361/683–687, 361/753, 724–731, 736–742, 748, 752, 756, 758, 770

(56) References Cited

U.S. PATENT DOCUMENTS

| | | | |
|---|---|---|---|
| 4,924,355 A | 5/1990 | Mitchell et al. ............. 361/415 |
| 5,481,431 A | 1/1996 | Siahpolo et al. ............. 361/685 |
| 5,586,003 A | 12/1996 | Schmitt et al. ............. 361/683 |
| 5,588,728 A | 12/1996 | Eldridge et al. ......... 312/332.1 |
| 5,652,695 A | 7/1997 | Schmitt ....................... 361/685 |
| 5,654,873 A * | 8/1997 | Smithson et al. ........... 361/685 |
| 5,668,696 A | 9/1997 | Schmitt ....................... 361/685 |
| 5,694,291 A | 12/1997 | Feightner .................... 361/683 |
| 5,737,185 A | 4/1998 | Morrison et al. ........... 361/685 |
| 5,751,551 A * | 5/1998 | Hileman et al. ............ 361/753 |
| 5,757,618 A * | 5/1998 | Lee ............................. 361/686 |
| 5,790,373 A | 8/1998 | Kim et al. ................... 361/685 |
| 5,877,938 A | 3/1999 | Hobbs et al. ............... 361/724 |
| 5,886,869 A | 3/1999 | Fussell et al. .............. 361/685 |
| 6,018,456 A * | 1/2000 | Young et al. ............... 361/684 |
| 6,084,768 A * | 7/2000 | Bolognia .................... 361/685 |

* cited by examiner

*Primary Examiner*—Darren Schuberg
*Assistant Examiner*—Yean-Hsi Chang
(74) *Attorney, Agent, or Firm*—Skjerven Morrill LLP; Philip W. Woo

(57) ABSTRACT

A computer system with densely-mounted components and effective cooling is provided. A hard drive mounting structure for "hot swap" hard drives utilizes a hard drive assembly in which a hard drive is mounted between a pair of parallel rails connected by a retaining portion. The rails provide a precise mechanism for loading and unloading the "hot swap" drive, without increasing the overall height of each hard drive assembly. A handle with double-cam actuation is used during insertion and removal of the hard drive assembly. In accordance with the present invention, two half-height hard drives may be stacked in a server mountable in a 2U rack. A tool-less lock is provided for releasably securing expansion cards to the computer case without the use of screws.

30 Claims, 8 Drawing Sheets

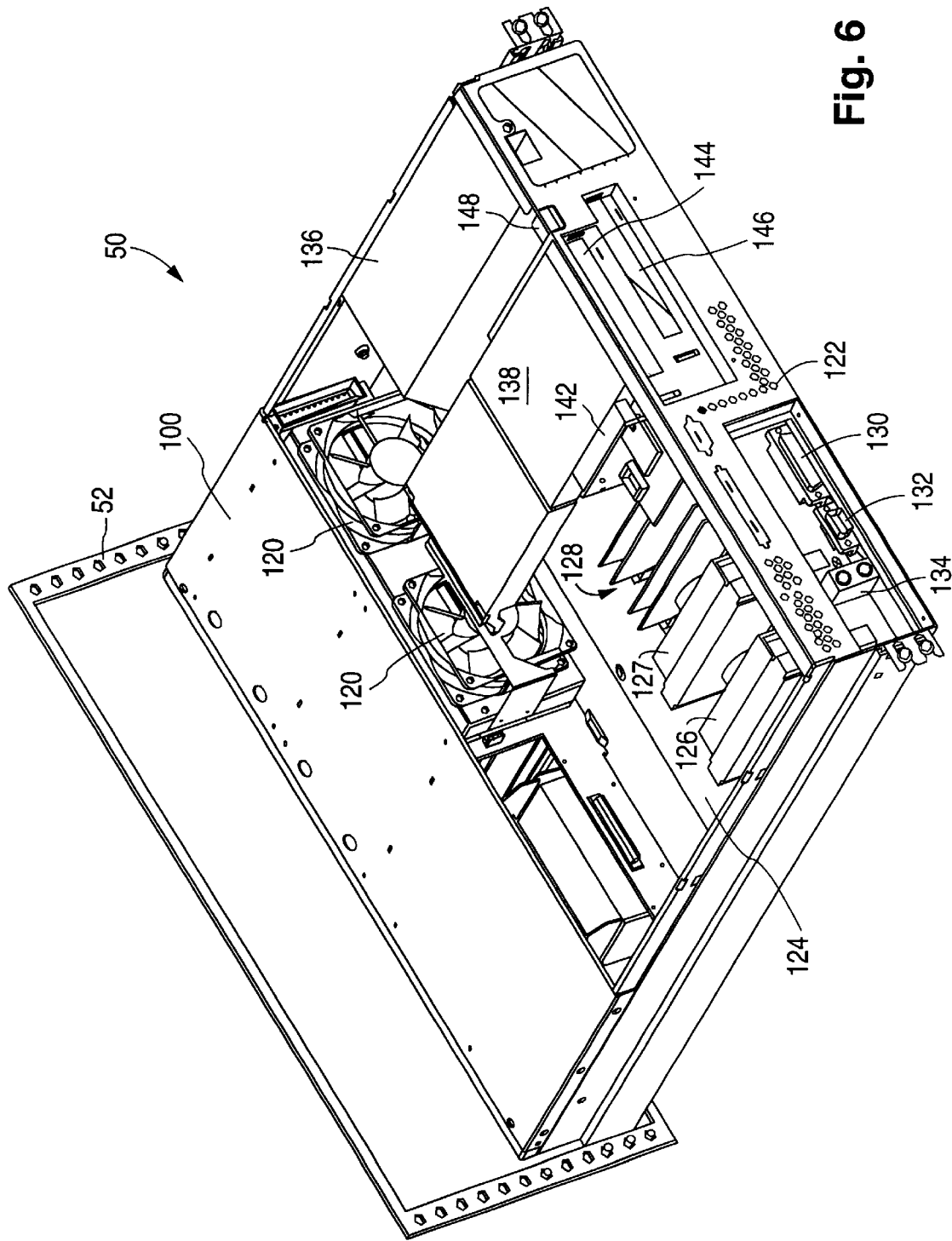

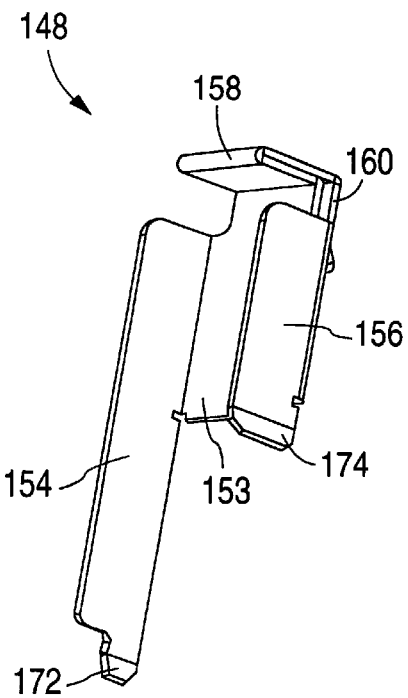
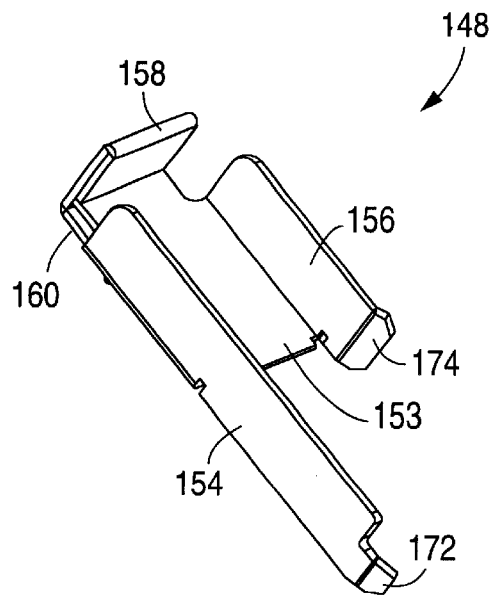
Fig. 8A    Fig. 8B
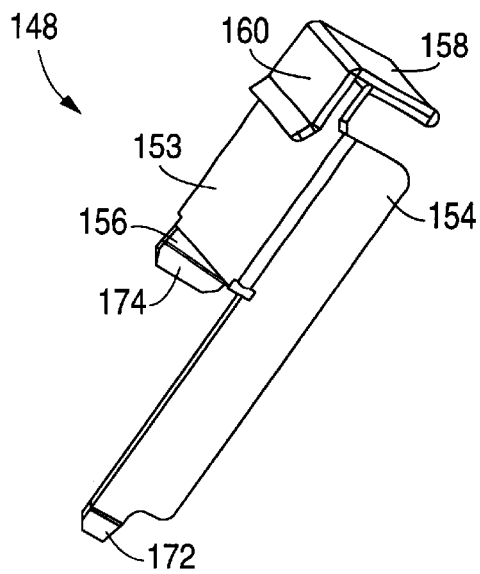
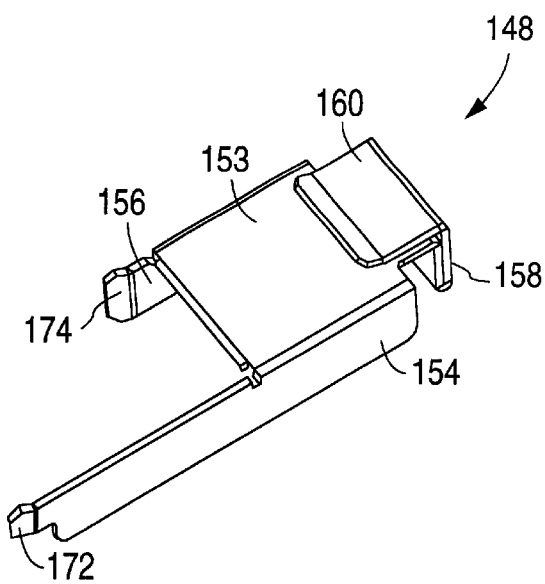
Fig. 8C    Fig. 8D

COMPUTER SYSTEM FOR HIGHLY-DENSE MOUNTING OF SYSTEM COMPONENTS

FIELD OF THE INVENTION

This invention relates to computer systems, and more specifically, the design and layout of components of computer systems.

BACKGROUND

With the growth of computing applications, there has been an associated increase in the need for servers and larger scale computer systems. These server systems include such components as CPUs, hard drives, CD-ROMs, DVDs, tape backup systems, peripheral cards, monitors, and universal power supplies. Network servers require a significant amount of storage capacity, typically in the form of hard disk drives. A single server may use many hard disk drives to increase the total storage capacity, or, in an arrangement known as a Redundant Array of Inexpensive Disks ("RAID"), to provide secure data redundancy. In a RAID system, if one hard drive fails, information in the other drives is used to recover the lost data. Some RAID systems provide for "hot swapping," in which a failed hard drive can be replaced and the lost data reconstructed from the remaining drives without powering down the system.

"Hot swap" drives include several characteristics not normally required by conventional PC hard drives. "Hot swap" drives require greater accessibility than conventional drives, which are typically mounted in the computer chassis and attached to an internal hard drive bay. It is desirable to place the "hot swap" drives in easily accessible bays, mounted such that they are readily removable without having to open the computer case. It is additionally desirable that the drives be capable of making proper electrical connections with the network computer when being replaced. When the interface connectors on the hard drive are not properly mated to their corresponding connectors, connector pin damage or failures caused by intermittent breaks in the electrical transmissions between the computer and the drive may result.

The various server components can be mounted vertically on a server rack or cabinet in a dedicated server location, often with temperature, humidity, and particle controls. Using such racks, server components can be stored with high space efficiency, while allowing easy visual and manual access. Server racks and cabinets have standard size mounting holes to which computer equipment can be attached. Rack-mounted equipment are typically provided in "U" sizes. A 1U sized component measures 1.75" high, 19.00" wide, and 20.00" deep, while a 2U sized component is 3.5" high. These slim form factors allow a larger number of devices to be mounted on a given rack. However, these slim cases pose difficult design problems for engineers attempting to add additional components into the limited available space. For larger components, such as monitors, RAID disk arrays, or larger servers, the rack must be provided with taller openings, such as a 4U or 6U rack.

One type of server manufactured and sold by the assignee of this invention is the VArServer 700. The body of the VArServer 700 is provided with five hard drive bays into which half-height hard drives can be mounted to form a RAID array. Hard drives sold by different manufacturers are typically provided in standard sizes, thus allowing the hard drives from different manufacturers to be used interchangeably. Half-height hard drives are 1.625" tall and are often chosen for server systems because of their increased storage capacity (up to 36 GB, at the time of this application's filing). The drives in the VArServer 700 are mounted in two stacks of two drives, plus a single drive. Because of the size of the array of hard drives and the thickness of the drives and the related mounting structure, the server requires a tall 4U chassis.

Another type of server manufactured and sold by the assignee of this invention is the VArServer 500. The VArServer 500 has a compact 2U form factor, which limits the size of the hard drives its chassis can accommodate. Because of its limited size, the VArServer 500 may utilize "low profile" drives, which are approximately 1.0" high, rather than the half-height drives preferred in server systems.

It is also known to mount different size drives in a single case. In one type of system, a low profile drive is mounted on top of a half-height drive in a 2U case. Although this provides increased storage capacity over a system using only low profile drives, a disadvantage of this system is that the low profile and half-height drives cannot be used interchangeably. In particular, this limits the type of "hot swapping" that can be used for this server.

Hard drives are not the only system components that create challenges for design engineers. High-end computer systems may utilize numerous expansion cards, such as video accelerators or network cards. These cards plug into expansion slots using various methods well known in the art. These cards are referred to as "PCI cards," because they often operate in conjunction with a PCI bus on a computer. As the number of components increase, while the amount of available space inside the server case decreases, providing secure mounts and expansion slots for such cards poses a significant problem.

Another limiting factor with high-end computing systems is ensuring effective heat dissipation from the various hardware components. In particular, the central processing unit and the electrical components mounted on the various circuit boards in the computer system generate large amounts of heat. Without proper cooling, these components can fail or can cause other components mechanisms to fail. One conventional method of cooling these components is the use of a fan mounted on a side of the chassis to force air to flow from outside the chassis into and over the circuit boards. In a given chassis, this method is effective when the number and size of the components to be cooled are small. However, as more and more components are squeezed into smaller server cases, it becomes increasingly difficult to create an effective airflow. In addition, these additional components increase the overall cooling requirements of the system.

SUMMARY OF THE INVENTION

In accordance with the present invention, a computer system with densely-mounted components and effective cooling is provided. In one embodiment, a hard drive mounting structure for "hot swap" hard drives utilizes a hard drive assembly in which a hard drive is mounted between a pair of parallel rails connected by a retaining portion. The rails provide a precise mechanism for loading and unloading the "hot swap" drive, without increasing the overall height of each hard drive assembly. A handle with double-cam actuation is used during insertion and removal of the hard drive assembly. In accordance with the present invention, two half-height hard drives may be stacked in a server mountable in a 2U rack.

A computer system for highly dense mounting of components is provided, wherein the computer system comprises a case including a drive bay and a drive assembly removably mounted in the first drive bay, wherein the drive assembly of the computer system comprises a hard drive and a hard drive chassis. The hard drive chassis comprises a first rail provided along a first side of the hard drive; a second rail substantially parallel to the first rail and provided along a second side of the hard drive opposite the first side; and a retaining portion adjacent a front side of the hard drive and connecting a front end of the first rail to a front end of the second rail; wherein the top and bottom portions of the hard drive are not covered by the hard drive chassis.

In another aspect of the present invention, a first notch is provided on a first interior side of the first drive bay; a shoulder is provided on a second interior side of the first drive bay opposite the first interior side; a handle is rotatably connected to the retaining portion of the first drive chassis and has a first end and a second end distal from the first end. The handle is rotatable about an axis located between the first and second ends of the handle. The handle defines a closed position in which the first end of said handle is a first distance from the front end of the first rail of the first drive assembly, and defines an open position in which the handle is rotated about the axis such that the first end of the handle is a second distance from the front end of the first rail of the first drive assembly, the first distance being less than the second distance. A first latch is provided on the first end of the handle and adapted to engage the first notch when the first drive assembly is inserted into the first drive bay and the handle is in the closed position; and a cam is provided at the second end of the handle and adapted to abut the shoulder when the first drive assembly is inserted into the first drive bay.

In another aspect of the present invention, a clip for retaining expansion boards is provided, wherein the retaining clip comprises a clip body; a stabilizing projection attached to a top portion of the clip body, adapted to be mounted on a computer case such that said stabilizing projection is positioned on an exterior of the case and the clip body is positioned on an interior of the case; and a first flange attached to a side of the clip body and adapted to abut a first expansion board, thereby preventing horizontal movement of the first expansion board.

BRIEF DESCRIPTION OF THE FIGURES

FIG. 6 illustrates a rear perspective view of a partially-exposed server.

FIGS. 8A–8D illustrate multiple perspectives of the expansion card retainer.

DETAILED DESCRIPTION

Figure 1:
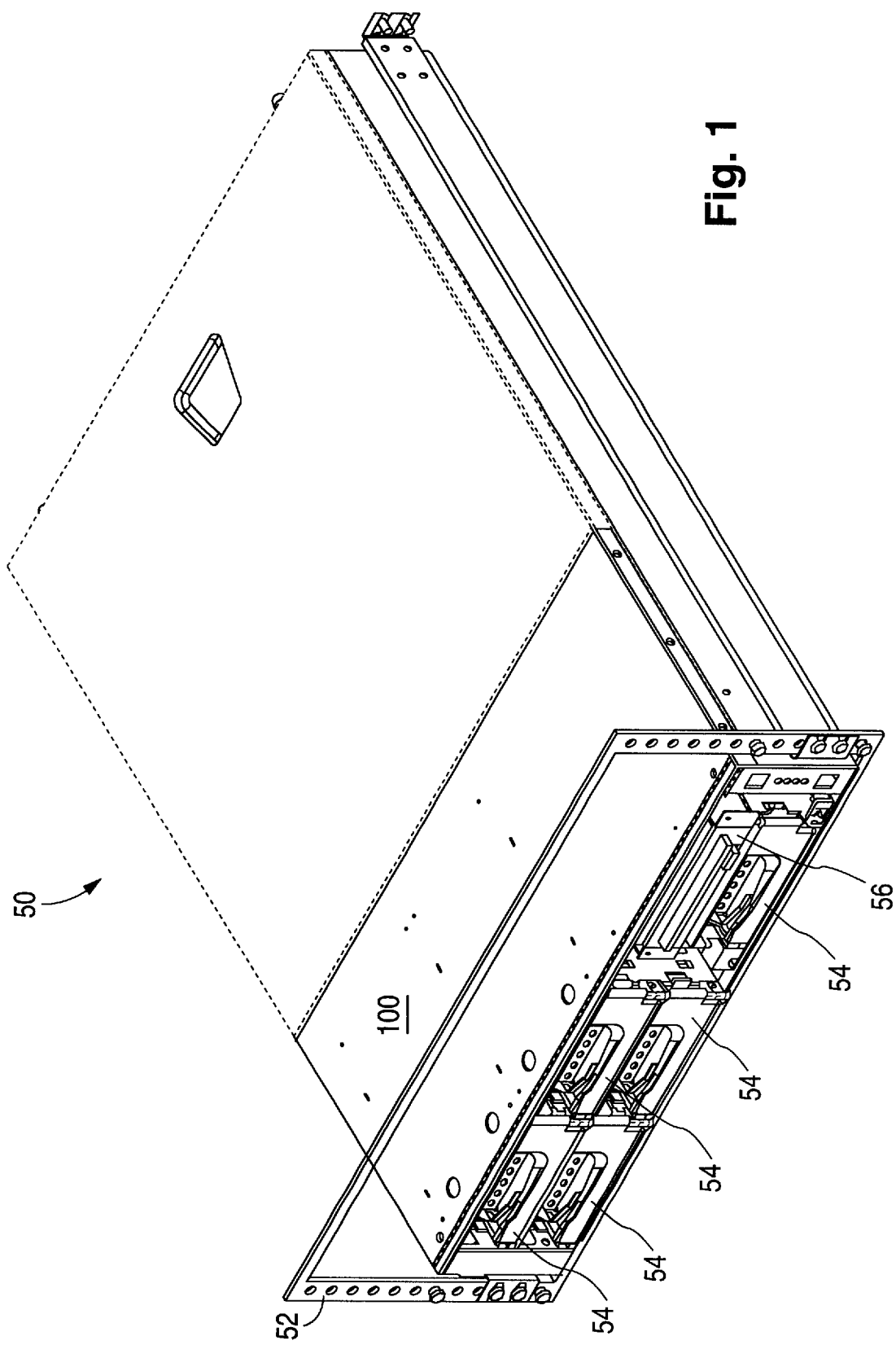
FIG. 1 shows a server in accordance with one aspect of the present invention.

As shown in FIG. 1, server 50 is mounted in a 2U space on rack 52 (partially illustrated in FIG. 1). Server 50 includes five "hot swap" hard drives 58 (FIG. 2) provided in interchangeable hard drive assemblies 54, and one removable media drive 56, shown in FIG. 1 as a floppy disk drive. Alternatively, the bay in which removable media drive 56 is mounted can include a CD-ROM drive, a DVD drive, or yet another hard drive assembly 54.

Figure 2:
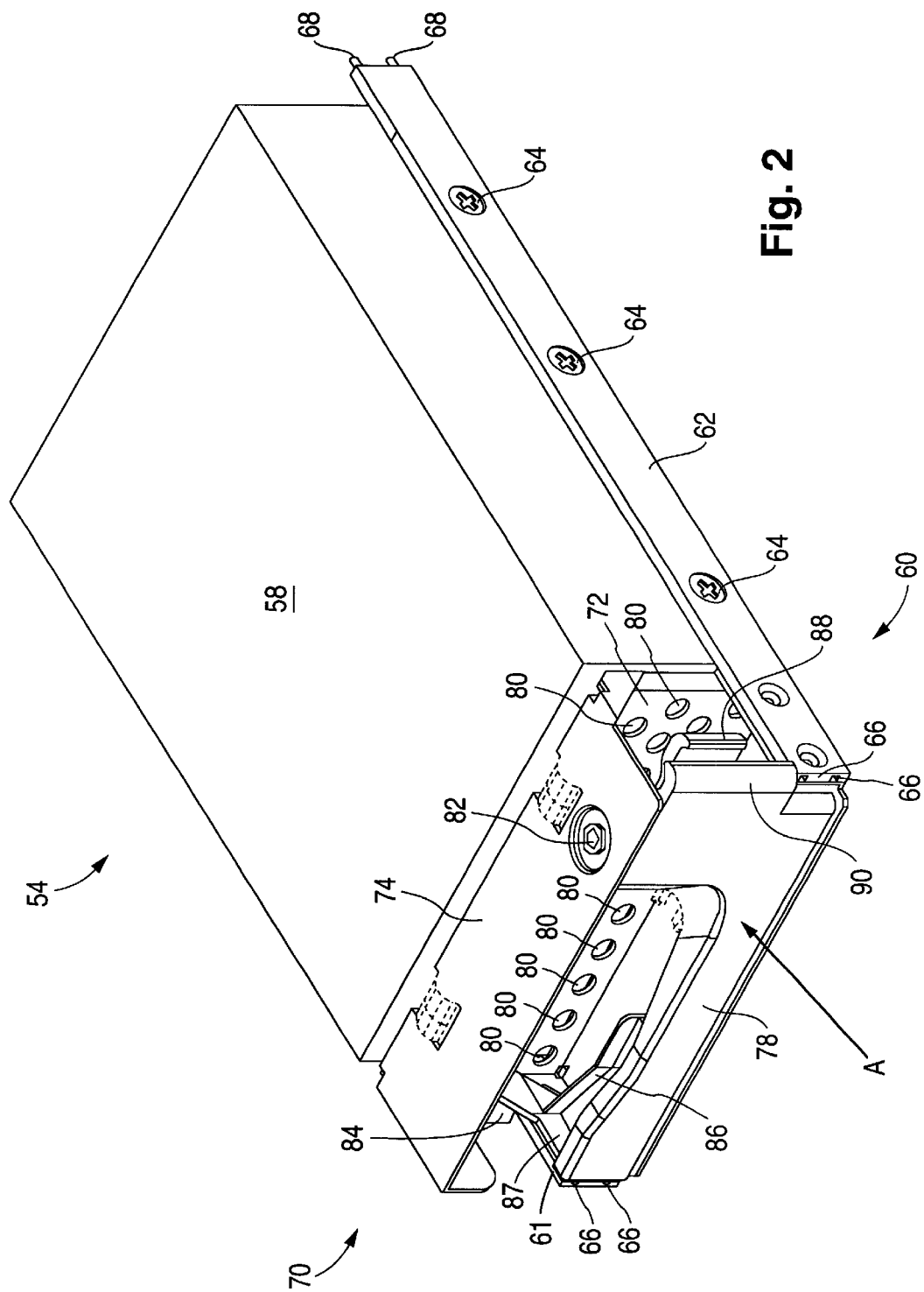
FIG. 2 illustrates an exemplary hard drive assembly with the handle in the closed position.
Figure 4:
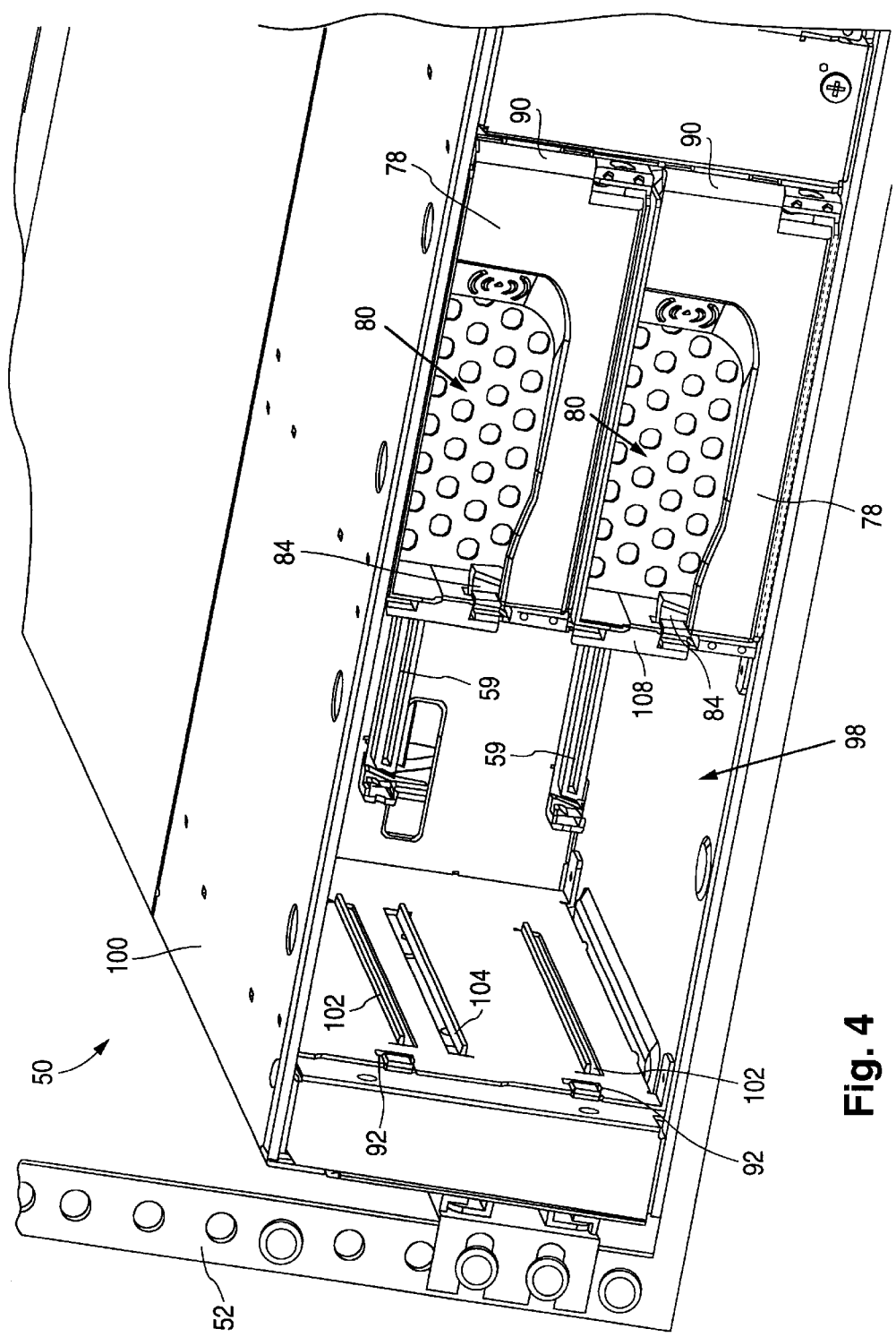
FIG. 4 illustrates an enlarged view of an empty hard drive bay.

Hard drive assembly 54 is shown in greater detail in FIG. 2. Assembly 54 includes hard drive 58 mounted in hard drive chassis 60. Hard drive 58 is shown in FIG. 2 as a featureless box, but in actuality is a half-height hard drive including various surface features. As is well known in the art, hard drive 58 typically includes a sealed aluminum case with an electronic circuit board attached on the bottom. An interface connector (not shown) is provided on a rear portion of hard drive 58, and it includes pins which mate with an interface 59 provided in hard drive bay 98 (FIG. 4). Although the upper and lower surfaces of hard drive 58 have a varied topography, the highest points on these surfaces define the upper and lower planes of hard drive 58, as illustrated by the flat, featureless surfaces of hard drive 58 in FIG. 2.

In accordance with one aspect of the present invention, hard drive chassis 60 includes first rail 61 and second rail 62, attached to opposite sides of hard drive 58 using screws 64. In one embodiment, rails 61, 62 are made of aluminum with a hard, anodized coating, and measure 0.1"×0.5"×7.0".

Rails 61, 62 include channels 66 into which "light pipes" 68 are provided. Light pipes 68 are fiber optic filaments for transmitting light from the back of hard drive assembly 54 to the front end of assembly 54. When hard drive assembly 54 is mounted in hard drive bay 98 (FIG. 4), the back end of light pipes 68 are positioned adjacent light sources in the back end of drive bay 98. These light sources indicate the status of the mounted drive. Light pipes 68 transmit the status information from the back of the assembly 54 to the front, where the light can be seen by a computer operator to indicate, for example, whether the drive is in use (i.e., having read/write disk activity) or has failed. Assembly 54 in FIG. 2 includes two light pipes 68 in each rail 61, 62. In practice, however, any number of light pipes 68 may be used, and they may be provided in one rail.

Hard drive chassis 60 also includes a retaining portion 70 provided adjacent to the front portion of hard drive 58. Retaining portion 70 is connected to first and second rails 61, 62 and includes face plate 72, top plate 74, and bottom plate 76. Face plate 72 includes holes 80, which allow ambient air to be drawn into assembly 54 to cool hard drive 58 and other components mounted in server 50. Top plate 74 and bottom plate 76 are connected to the top and bottom edges, respectively, of face plate 72, and have mounted between them handle 78.

Figure 3:
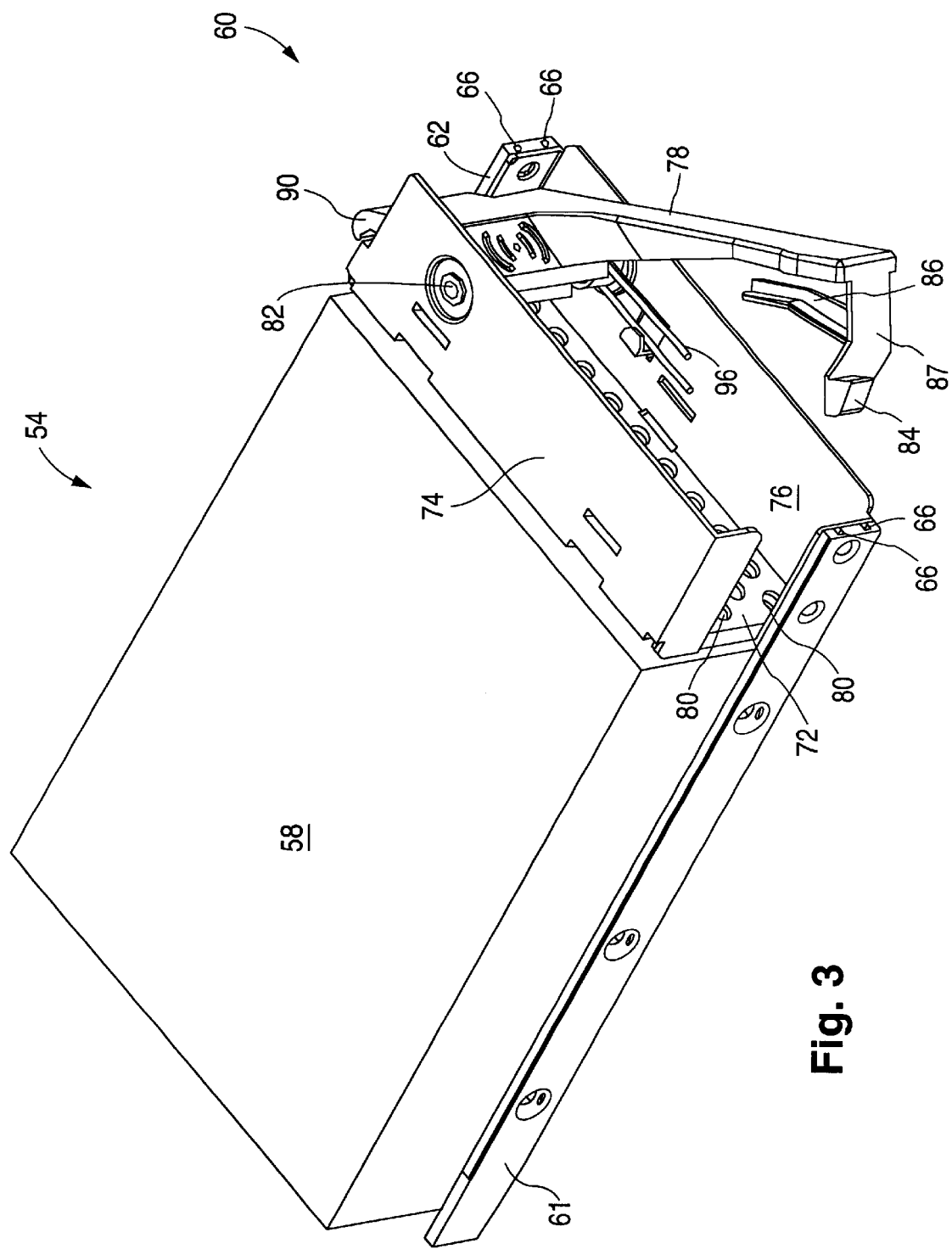
FIG. 3 illustrates another view of the exemplary hard drive assembly with the handle in the open position.

Handle 78 is rotatably mounted to top plate 74 and bottom plate 76 to rotate about axis 82. First latch 84 is provided on one end of handle 78, and second latch 88 is provided on the opposite end. First latch 84 is adapted to engage first notch 92 (FIG. 4) in hard drive bay 98, and is released when a force is applied to latch pull 86. Second latch 88 is adapted to engage a second notch (not shown), provided on the opposite side of hard drive bay 98 from first notch 92. Cam 90 is provided on handle 78 adjacent to second latch 88. Spring 96 (FIG. 3) provides a constant spring force urging handle 78 to rotate into the open position such that first latch 84 is moved outwards, away from hard drive 58.

The insertion process for assembly 54 and the operation of handle 78 are as follows. FIG. 4 shows empty hard drive bay 98 of server 50. When assembly 54 is not mounted in bay 98, handle 78, of hard drive assembly 54 is urged by spring 96 to remain in the open position, shown in FIG. 3. Assembly 54 is inserted into bay 98 by positioning first rail 61 between upper rail guide 102 and lower rail guide 104, and similarly positioning second rail 62 between the upper rail guide and lower rail guide (not shown) provided on the opposite side of bay 98. The hard drive assembly 54 loaded into the lower bay 98 can rest on the bottom of case 100, therefore eliminating the need for lower guide rail 104. Thus, only upper guide rail 102 is used to guide assembly 54 into bay 98 and ensure proper electrical connections. Hard drive assembly 54 loaded into the upper bay 98 utilizes both upper and lower guide rails 102, 104 to ensure proper alignment and to provide support for the upper drive assembly 54 when the lower drive assembly 54 is removed.

Figure 5A:
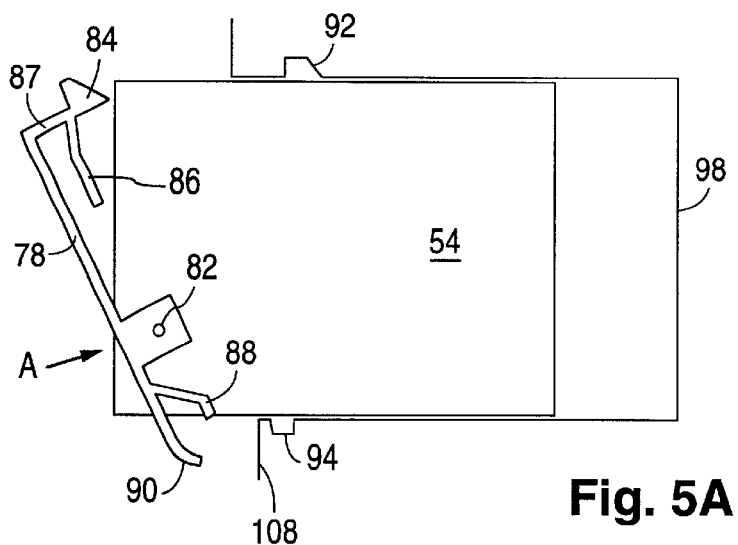
FIGS. 5A–5C illustrate the operation of the handle, cam, and latching mechanism for insertion and removal of the hard drive assembly into the hard drive bay.
Figure 5B:
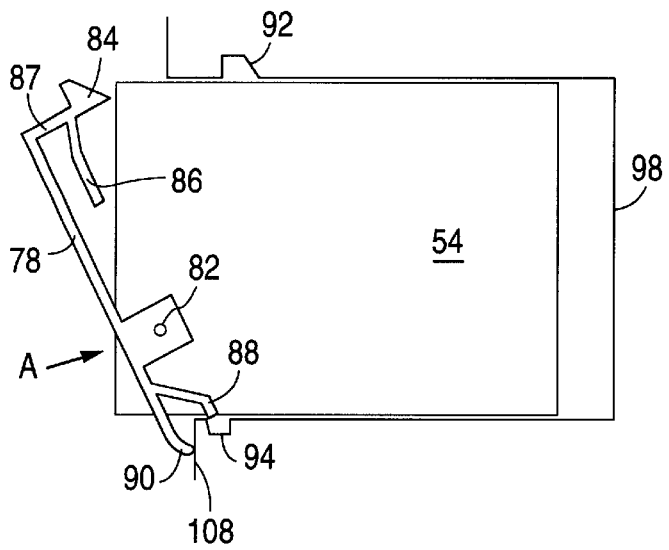
Figure 5C:
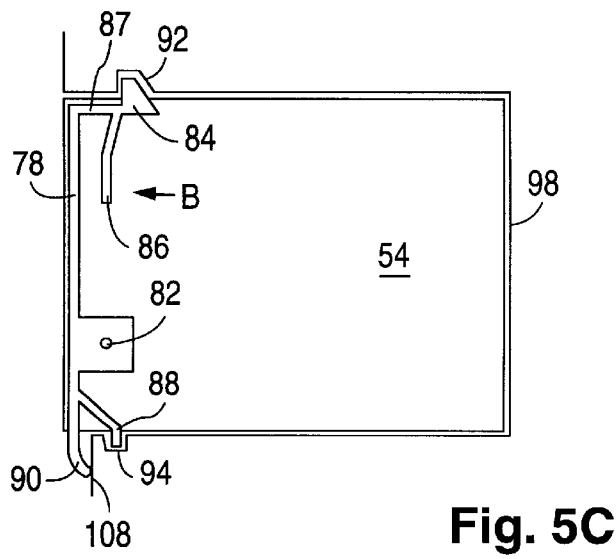

As shown in simplistic form in FIGS. 5A–5C, assembly 54 can be pushed deeper into bay 98 by applying a force in direction A at about the location of axis 82 on the face of handle 78. Handle 78 shown in FIGS. 1–4 has a flat front surface such that when assembly 54 is mounted into bay 98, handle 78 lies flush with the front surface of case 100 of server 50. However, when handle 78 is in the open position, the surface of handle 78 is at an angle relative to the direction of rearward force (i.e. direction A) required to push assembly 54 into bay 98. By applying the insertion force at the location of the axis of rotation, a rearward force can be applied to assembly 54 as a whole, without disturbing the open position of handle 78. Alternatively, handle 78 may be provided with a slight contour at the location where the insertion force is to be applied so that when handle 78 is in the open position, the front surface of handle 78 at that location is orthogonal to arrow A, thus improving the feel of operation.

Handle 78 also includes cam 90, which protrudes beyond the right edge of hard drive 58. At a point during the insertion of assembly 54 into bay 98, protruding cam 90 makes contact with shoulder 108 provided on the side of bay 98, as shown in FIG. 5B. After cam 90 makes contact with shoulder 108, the continued application of insertion force causes hard drive assembly 54 to move rearward into the bay 98 and additionally causes handle 78 to rotate about axis 82 to move from the open position to the closed position. As shown in FIG. 5C, just as assembly 54 is fully inserted into bay 98, handle 78 rotates such that first latch 84 engages first notch 92, locking handle 98 into the closed position. At this same time, second latch 88 filly engages second notch 94. First and second latches 84, 88 securely retain hard drive assembly 54 in proper connection with bay 98. The lever action created by cam 90 additionally assists in providing leverage to smoothly and accurately mate hard drive 58 to bay interface 59.

To remove assembly 54, a user pulls on latch pull 86, applying force in the direction of arrow B, shown in FIG. 5C. This force would cause portion 87 of latch 84 to bend, thereby disengaging latch 84 from notch 92. After latch 84 is disengaged and the user continues pulling on latch pull 86, handle 54 then rotates from the closed position to the open position, leaving latch 84 in the position shown in FIG. 5B. The rotation of handle 78 causes second latch 88 to disengage from second notch 94. While the user applies a force on latch pull 86, handle 78 also acts as a lever to pull assembly 54 out of bay 98. Cam 90, which abuts shoulder 108, corresponds to the fulcrum, and the point where handle 78 connects to axis 82 corresponds to the load. The removal force applied to latch pull 86 assists in removing assembly 54, and, in particular, provides additional leverage for smoothly separating the electric interface connection between hard drive 58 and hard drive bay 98.

Figure 7:
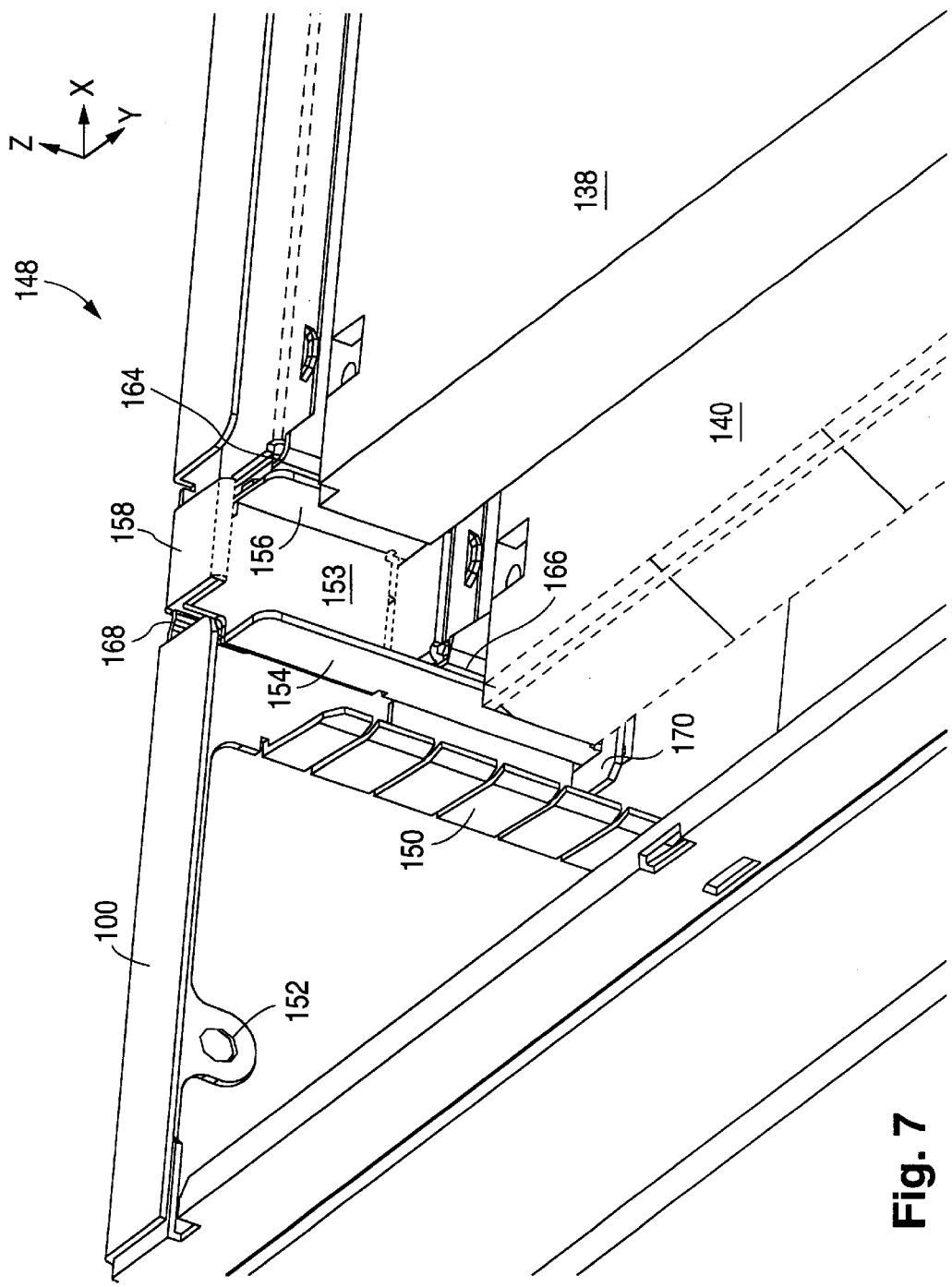
FIG. 7 illustrates a close-up view of an expansion card retainer in the system case.

FIG. 6 illustrates a rear view of server 50 with case 100 partially removed. Fans 120 are positioned directly behind hard drive bays 98. Fans 120 create a high pressure air flow from the front of server 50 to the rear of server 50 by pulling ambient air through holes 80 in face plates 72 of each hard drive assembly 54. This cooling air flow then passes over and under each hard drive 58, uniformly cooling the circuit boards and hard drive mechanisms of each hard drive 58. Rear ventilation holes 122 allow the cooling air to exit the rear of case 100. Because hard drives 58 are densely packed in the low profile 2U case 100, very little room exists between each drive 58 to allow air to flow. However, the above-described structure of the present invention, as illustrated in FIG. 7 enables effective cooling by creating air flow above and below each hard drive assembly 54, with the advantage of having five "hot swappable" half-height hard drives for storage.

In accordance with one aspect of the present invention, handle 78 advantageously provides an efficient mechanism for easily inserting and removing hard drive assembly 54 from hard drive bay 98. This mechanism utilizes cam 90 for effectuating both proper latching of first and second latches 84, 88 during insertion, as well as easy disengagement of latches 84, 88 and removal.

In accordance with another aspect of the present invention, hard drive chassis 60, including rails 61, 62, retaining portion 70, and handle 78, effectively provides a compact, yet simple and precise mechanism for mounting hard drives 58. Hard drive chassis 60 provides an effective carrier and mounting mechanism for standard size hard drives, with a minimum of additional structure, thereby enabling very high density packing of components in a compact server case 100.

Rails 61, 62 advantageously provide a solid support for hard drive 58, both when hard drive 58 is mounted in the hard drive bay 98 and when drive 58 is removed from the computer and is being carried about. At the same time, rails 61, 62 do not increase the overall height of the drive and do not interfere with the free flow of cooling air over the top and bottom surfaces of drive 58. Rails 61, 62 can be used in conjunction with rail guides 102, 104 to provide very accurate mounting and removal of drive assembly 54 during hot swapping. This helps to ensure stable connections between the connection interface on hard drive 58 and the connection interface in the drive bay 98 and helps prevent damage to the pins in connection interface.

While the hard drive assemblies and mountings described above consume most of the available space in the front of case 100 of server 50, FIG. 6 illustrates several other components which are arranged in the rear of case 100. For clarity, not all components and connections are shown, and many of the components shown include only simplistic detail.

Motherboard 124 is a printed circuit board onto which dual processors 126, 127 are mounted. Such processors 126, 127 are well known in the art and may be, for example, Pentium-type processors manufactured by the Intel Corporation. RAM memory 126 is also installed onto motherboard 124. Parallel port 130, serial port 132, and mouse and keyboard ports 134 allow external devices to be attached to server 50. Power supply 136 provides power to the entire system.

Server 50 also provides expansion slots for up to two expansion cards. Because of the low profile of case 100, expansion cards 138, 140 are mounted horizontally. Upper expansion card 138 (shown in FIG. 6) plugs horizontally into upper expansion slot 142 and is held in place by retaining clip 148. Lower expansion card 140 (FIG. 7) plugs into a lower expansion slot (not shown), slightly offset from upper expansion slot 142. Upper and lower expansion cards 138, 140 may be accessed by external devices through expansion card access ports 144, 146, respectively. As can be seen in FIG. 6, the various components of server 50 are very densely mounted in the minimal space available in case 100. In particular, expansion cards 138, 140 are mounted very close to power supply 136, restricting the design of the mounting structure for cards 138, 140.

FIG. 7 illustrates a close-up view of the retaining clip 148 mounted on case 100. FIGS. 8A–8D illustrate retaining clip 148 from multiple perspectives. For clarity, power supply 136 is not shown in FIG. 7, but would normally be mounted alongside flanges 150 and be secured to case 100 with a screw through eyelet 152. Retaining clip 148 includes a body portion 153, a first flange 156, a second flange 154, a top flange 158, and a stabilizing projection 160.

Expansion card 138 is provided with an edge connector, which is inserted into expansion slot 142 and provides mounting support for that edge of card 138. One corner along the opposite edge of card 138 includes a mounting bracket 164. Mounting bracket 164 is used to secure that edge of card 138 to case 100. In the prior art, mounting bracket 164 would be secured by inserting a screw in the x-direction through a notch or hole in bracket 164 to case 100. However, in case 100, when power supply 136 is mounted, power supply 136 inhibits access to mounting bracket 164, making it difficult to access the screw using a screwdriver. Expansion card 140 is mounted to an expansion slot beneath expansion slot 138, and poses similar difficulties in attaching mounting bracket 166 to case 100.

Thus, the present invention provides retaining clip 148 to quickly and easily stabilize the free ends of expansion cards 138, 140. After expansion cards 138, 140 are inserted into their respective expansion slots, retaining clip 148 is inserted into notch 168 on the side of case 100 such that first flange 154 prevents unwanted movement of mounting-bracket 166 on lower expansion card 140, and second flange 156 prevents unwanted movement of mounting bracket 164 on upper expansion card 138. In particular, flanges 154, 156 prevent cards 138, 140 from moving in the x-direction, which may result in a disconnection of the edge connectors to the expansion slots.

Retaining clip 148 provides the added advantage of simple installation. No screws or tools of any sort are needed; clip 148 is simply placed onto notch 168 such that stabilizing projection 160 and body 153 straddle notch 168 on either side of case 100. If desired, stabilizing projection 160 and body 153 can be formed to "pinch" case 100, thereby maintaining clip 148 in its proper mounted position.

Slot 170 is provided in case 100 and is adapted to receive table 172 provided on the bottom end of second flange 154, thereby providing additional stability for retaining clip 148. An additional slot (not shown) can also be provided to mate with tab 174 on the bottom end of first flange 156. The bottom edge of body 153 may rest on a shoulder portion of case 100, providing vertical support for clip 148. Clip 148 is also easily removable, in the event that one of the expansion cards 138, 140 is replaced.

Applicants have implemented aspects of the present invention in constructing a server 50, which can be mounted in a 2U rack, yet is capable of accepting up to six half-height hard drives. (The embodiment shown in FIG. 1 includes only five hard drives, reserving the last bay 98 for floppy drive 56.) In this embodiment, the entire server 50 measures 3.500" tall. The upper layer of casing is formed of thin gauge steel measuring just 0.047" thick. The lower layer of casing is formed of 0.039" thick steel. When two half-height hard drives, 1.625" thick each, are mounted within this structure, there remains only 0.164" of clearance for air to flow.

Ideally, equal spacing is provided above and below the upper and lower hard drives. Thus, where the upper and lower surfaces of the hard drives define upper and lower planes of the hard drives, the upper plane of the upper hard drive is spaced from the upper layer of casing by approximately 0.055", the lower plane of the upper hard drive is spaced from the upper plane of the lower hard drive by approximately 0.055", and the lower plane of the lower hard drive is separated from the lower layer of casing by approximately 0.055".

The hard drive structure in accordance with the present invention enables very precise loading of "hot swap" half-height hard drives, while preserving adequate airflow over both the tops and bottoms of both stacked hard drives.

Although the invention has been described with reference to particular embodiments, the description is only an example of the invention's application and should not be taken as a limitation. For example, server 50 shown in the figures has a 2U profile and is used in conjunction with stacked half-height drives. However, a server in accordance with this invention may also be formed to fit in a 1U size rack. In this case, a single layer of half-height drives are used. Various other adaptations and combinations of features of the embodiments disclosed are within the scope of the invention as defined by the following claims.

We claim:

1. A computer system, comprising:
    a case including a first drive bay; and
    a first drive assembly removably mounted in the first drive bay, said first drive assembly comprising:
        a first hard drive; and
        a first drive chassis, comprising:
            a first rail provided along a first side of the first hard drive;
            a second rail substantially parallel to the first rail and provided along a second side of the first hard drive opposite the first side;
            a retaining portion adjacent a front side of the first hard drive and connecting a front end of the first rail to a front end of the second rail, the retaining portion comprising a top plate and a bottom plate;
            a first notch provided on a first interior side of the first drive bay;
            a handle rotatably connected to the retaining portion of the first drive chassis and between the top plate and the bottom plate, the handle having a first end and a second end distal from the first end, said handle being rotatable about an axis perpendicular to the top and bottom plates and located between the first and second ends of the handle, said handle defining a closed position in which the first end of said handle is a first distance from the front end of the first rail of the first drive assembly, and said handle defining an open position in which the handle is rotated about the axis such that the first end of the handle is a second distance from the front end of the first rail of the first drive assembly, the first distance being less than the second distance; and
            a first latch provided on the first end of the handle and adapted to engage the first notch when the first drive assembly is inserted into the first drive bay and the handle is in the closed position;

wherein the first drive chassis does not include any portion which is adjacent to a top surface and a bottom surface of the first hard drive.

2. The computer system of claim 1, further comprising:
a second drive bay provided beneath the first drive bay; and
a second drive assembly removably mounted in the second drive bay, said second drive assembly comprising:
a second hard drive; and
a second drive chassis, comprising:
   a first rail provided along a first side of the second hard drive;
   a second rail substantially parallel to the first rail and provided along a second side of the second hard drive opposite the first side; and
   a retaining portion adjacent a front side of the second hard drive and connecting a front end of the first rail to a front end of the second rail;
wherein the second drive chassis does not include any portion which is adjacent to a top surface and a bottom surface of the second hard drive.

3. The computer system of claim 2, wherein a lower plane of the first hard drive is separated from an upper plane of the second hard drive by less than about 0.1 inches.

4. The computer system of claim 2, wherein:
the case includes a top cover and a bottom cover;
an upper plane of the first hard drive is separated from the top cover by less than about 0.1 inches; and
a lower plane of the second drive assembly is separated from the bottom cover by less than about 0.1 inches.

5. The computer system of claim 2, wherein the second hard drive is a half-height hard drive.

6. The computer system of claim 2, wherein the second drive bay is adapted to receive a half-height hard drive.

7. The computer system of claim 2, further comprising:
a first guide rail provided on a first interior side of the second drive bay for receiving the first rail of the second drive assembly; and
a second guide rail provided on a second interior side of the second drive bay opposite the first interior side for receiving the second rail of the second drive assembly.

8. The computer system of claim 1, wherein said case is approximately 3.5 inches tall.

9. The computer system of claim 1, wherein the case is adapted to be mounted in a 2U rack mount.

10. The computer system of claim 1, wherein the first hard drive is a half-height hard drive.

11. The computer system of claim 1, wherein the first drive bay is adapted to receive a half-height hard drive.

12. The computer system of claim 1, further comprising:
a first pair of guide rails provided on a first interior side of the first drive bay for receiving the first rail of the first drive assembly; and
a second pair of guide rails provided on a second interior side of the first drive bay opposite the first interior side for receiving the second rail of the first drive assembly.

13. The computer system of claim 1, further comprising:
a shoulder provided on a second interior side of the first drive bay opposite the first interior side; and
a cam provided at the second end of the handle and adapted to abut the shoulder when the first drive assembly is inserted into the first drive bay.

14. The computer system of claim 13, wherein the first drive assembly further comprises:
a spring providing a force on the handle, urging the handle to rotate from the closed position to the open position.

15. The computer system of claim 13, further comprising:
a second notch provided on the second interior side of the first drive bay;
a second latch provided on the second end of the handle and adapted to engage the second notch when the first drive assembly is inserted in the first drive bay.

16. The computer system of claim 1, further comprising a fan provided in the case adjacent a rear portion of the first drive bay, said fan creating an airflow from a front side of the first drive assembly to a rear side of the first drive assembly.

17. The computer system of claim 1, wherein a top portion of the case is formed of thin gauge sheet metal less than approximately 0.05 inches thick.

18. The computer system of claim 1, wherein a bottom portion of the case is formed of thin gauge sheet metal less than approximately 0.05 inches thick.

19. The computer system of claim 1, further comprising, in the first rail of the first drive chassis, a light transmitting member for transmitting light from a rear portion of the first drive bay to a front portion of he first hard drive.

20. The computer system of claim 19, wherein:
the first rail of the first drive chassis defines a channel extending from a rear portion of the first hard drive to the front portion of the first hard drive; and
the light transmitting member is a fiber optic filament provided in the channel.

21. The computer system of claim 1, further comprising, in the second rail of the first drive chassis, a light transmitting member for transmitting light from a rear portion of the first drive bay to a front portion of the first hard drive.

22. The computer system of claim 21, wherein:
the second rail of the first drive chassis defines a channel extending from a rear portion of the first hard drive to the front portion of the first hard drive; and
the light transmitting member is a fiber optic filament provided in the channel.

23. A hard drive mounting structure, comprising:
a hard drive bay including:
   a first notch provided on a first interior side of said hard drive bay; and
   a shoulder provided on a second interior side of said hard drive bay opposite the first interior side; and
a hard drive assembly, comprising:
   a hard drive;
   a chassis attached to the hard drive, said chassis including a retaining portion positioned adjacent a front portion of the hard drive, the retaining portion comprising a top plate and a bottom plate;
   a handle rotatably connected to the retaining portion between the top plate and the bottom plate, the handle having a first end and a second end distal from the first end, said handle being rotatable about an axis perpendicular to the top and bottom plates and located between the first and second ends of the handle, said handle defining a closed position in which the first end of said handle is a first distance from the chassis, and said handle defining an open position in which the handle is rotated about the axis such that the first end of the handle is a second distance from the chassis, the first distance being less than the second distance;
   a first latch provided on the first end of the handle and adapted to engage the first notch when the hard drive assembly is inserted into the hard drive bay and the handle is in the closed position; and a cam provided at the second end of the handle and adapted to abut the shoulder when the hard drive assembly is inserted into the hard drive bay.

24. The hard drive mounting structure of claim 23, wherein the hard drive assembly further comprises:

a spring providing a force on the handle, urging the handle to rotate from the closed position to the open position.

25. The hard drive mounting structure of claim 23, further comprising:

a second notch provided on the second interior side of the hard drive bay;

a second latch provided on the second end of the handle and adapted to engage the second notch when the hard drive assembly is inserted in the hard drive bay.

26. The hard drive mounting structure of claim 23, wherein the chassis comprises:

a first rail provided along one side of the hard drive;

a second rail provided along an opposite side of the hard drive;

wherein the retaining portion is attached to a front end of the first rail and a front end of the second rail.

27. The hard drive mounting structure of claim 23, wherein the chassis does not include any portion which is adjacent to a top surface and a bottom surface of the hard drive.

28. The hard drive mounting structure of claim 23, further comprising:

a first guide rail provided on the first interior side of the hard drive bay for receiving the first rail of the hard drive assembly; and a second guide rail provided on the second interior side of the first drive bay for receiving the second rail of the hard drive assembly.

29. The hard drive mounting structure of claim 23, wherein the hard drive is a half-height hard drive.

30. The hard drive mounting structure of claim 23, further comprising a fan adjacent a rear portion of the hard drive bay, said fan creating an airflow from a front side of the hard drive assembly to a rear side of the hard drive assembly.

* * * * *